US009168701B2

(12) United States Patent
Ahmed

(10) Patent No.: US 9,168,701 B2
(45) Date of Patent: Oct. 27, 2015

(54) FIBERGLASS REINFORCED PLASTIC LIGHTWEIGHT HEAVY-DUTY LADDER AND METHOD OF MAKING SAME

(71) Applicant: Nasir U. Ahmed, Scottsdale, AZ (US)

(72) Inventor: Nasir U. Ahmed, Scottsdale, AZ (US)

(73) Assignee: ABSS MANUFACTURING CO., INC., Phoenix, AZ (US)

( * ) Notice: Subject to any disclaimer, the term of this patent is extended or adjusted under 35 U.S.C. 154(b) by 0 days.

(21) Appl. No.: 14/054,189

(22) Filed: Oct. 15, 2013

(65) Prior Publication Data

US 2014/0102830 A1 Apr. 17, 2014

Related U.S. Application Data

(60) Provisional application No. 61/714,577, filed on Oct. 16, 2012.

(51) Int. Cl.
| B29C 70/02 | (2006.01) |
| B29C 70/06 | (2006.01) |
| E06C 1/02 | (2006.01) |
| B29C 55/30 | (2006.01) |
| B29C 70/52 | (2006.01) |
| E06C 7/08 | (2006.01) |
| E06C 1/12 | (2006.01) |

(52) U.S. Cl.
CPC .............. B29C 70/025 (2013.01); B29C 55/30 (2013.01); B29C 70/06 (2013.01); B29C 70/521 (2013.01); E06C 1/02 (2013.01); E06C 7/08 (2013.01); E06C 1/12 (2013.01)

(58) Field of Classification Search
CPC .................... E06C 7/08; B32B 5/32
USPC .......................................... 428/218
See application file for complete search history.

(56) References Cited

U.S. PATENT DOCUMENTS

| 2,875,117 | A | * | 2/1959 | Kloote et al. ................. 442/224 |
| 3,158,224 | A | * | 11/1964 | Van Name et al. ............. 182/46 |
| 3,225,862 | A | * | 12/1965 | Fink ................................ 182/46 |
| 3,533,203 | A | * | 10/1970 | Fischer et al. ............. 52/223.14 |
| 3,674,110 | A | * | 7/1972 | Cooke ............................ 182/46 |
| 3,703,571 | A | * | 11/1972 | Roberts ....................... 264/46.6 |
| 4,029,172 | A | * | 6/1977 | Green ............................ 182/46 |
| 4,178,406 | A | * | 12/1979 | Russell ....................... 442/391 |
| 4,364,990 | A | * | 12/1982 | Haines ........................ 428/218 |
| 4,376,151 | A | * | 3/1983 | Parrotta ....................... 428/323 |
| 4,848,745 | A | * | 7/1989 | Bohannan et al. ............ 473/119 |
| 4,906,518 | A | * | 3/1990 | Inabata ....................... 428/218 |
| 5,981,025 | A | * | 11/1999 | Marshall et al. ............. 428/116 |
| 6,077,597 | A | * | 6/2000 | Pause ......................... 428/218 |
| 7,306,834 | B2 | * | 12/2007 | Nonomura et al. ......... 428/34.2 |
| 2006/0032705 | A1 | | 2/2006 | Isham et al. |
| 2007/0204948 | A1 | | 9/2007 | Gauchel et al. |
| 2007/0205053 | A1 | * | 9/2007 | Isham et al. .................. 182/207 |
| 2008/0090060 | A1 | * | 4/2008 | Kia et al. ...................... 428/215 |
| 2010/0055431 | A1 | * | 3/2010 | College ....................... 428/218 |
| 2013/0213739 | A1 | | 8/2013 | Kelly |
| 2013/0273341 | A1 | * | 10/2013 | Albertelli et al. ............. 428/218 |

FOREIGN PATENT DOCUMENTS

EP 0747204 A2 12/1996

* cited by examiner

*Primary Examiner* — Colleen M Chavchavadze

(57) ABSTRACT

A fiberglass reinforced lightweight heavy-duty ladder, and method of making the same, is presented. The method includes impregnating rovings with a resin system and forming the impregnated rovings into a set of rails having a center portion, a left sidewall portion, and a right sidewall portion, where the left sidewall portion and the right sidewall portion each have an article roving density at least 10% greater than that of the center portion.

11 Claims, 10 Drawing Sheets

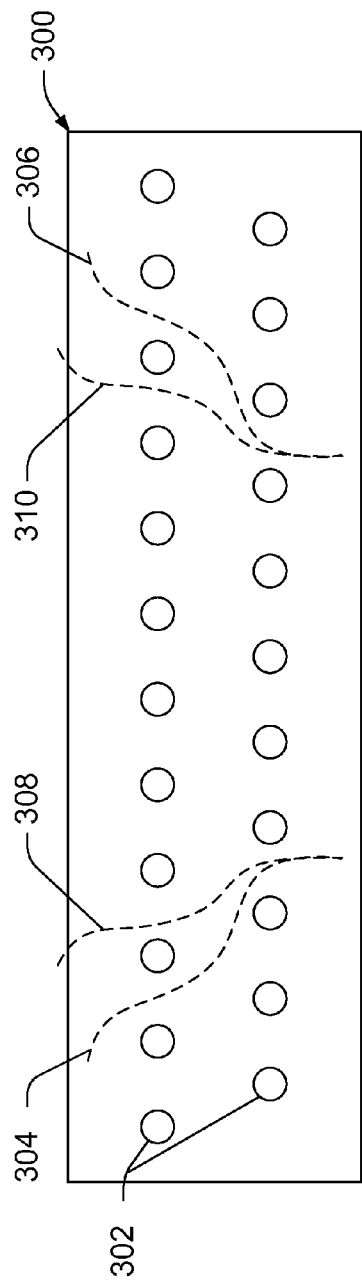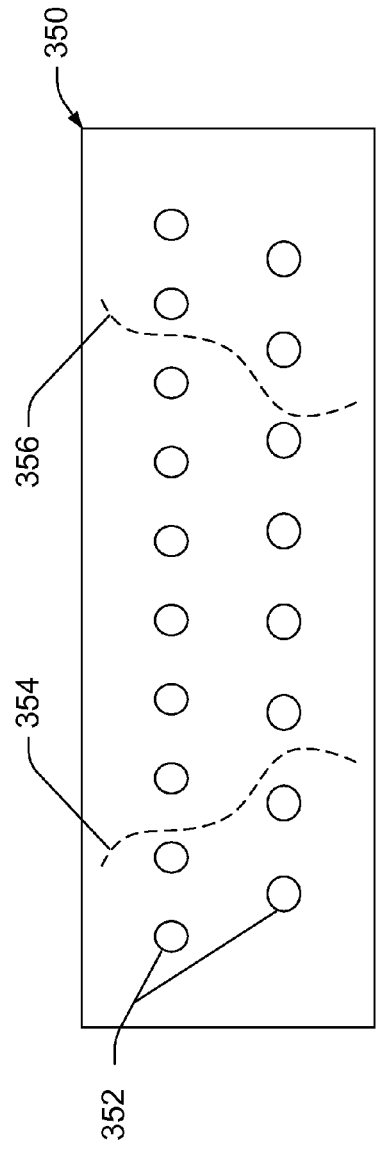
Fig. 3(a)
Fig. 3(b)

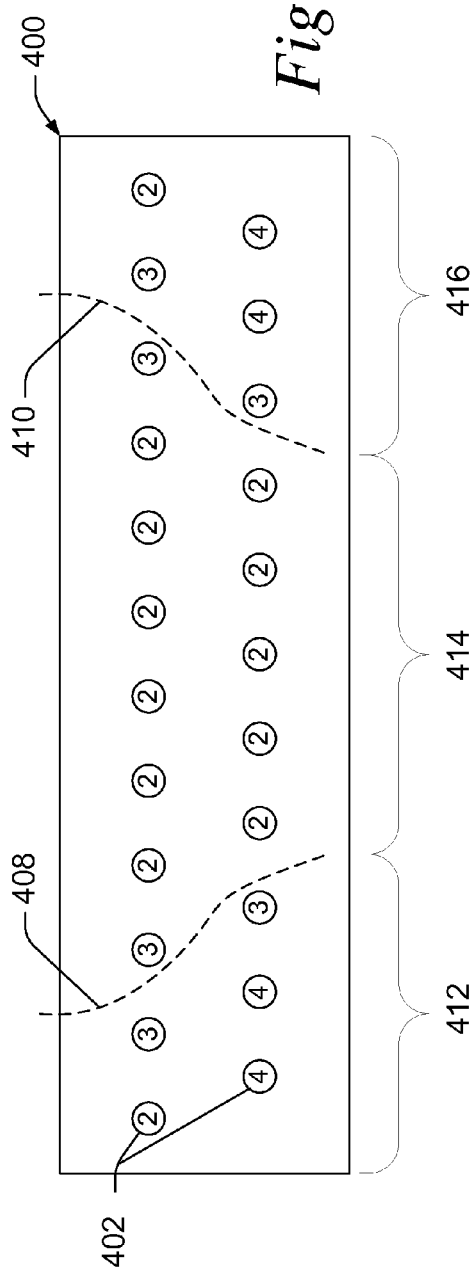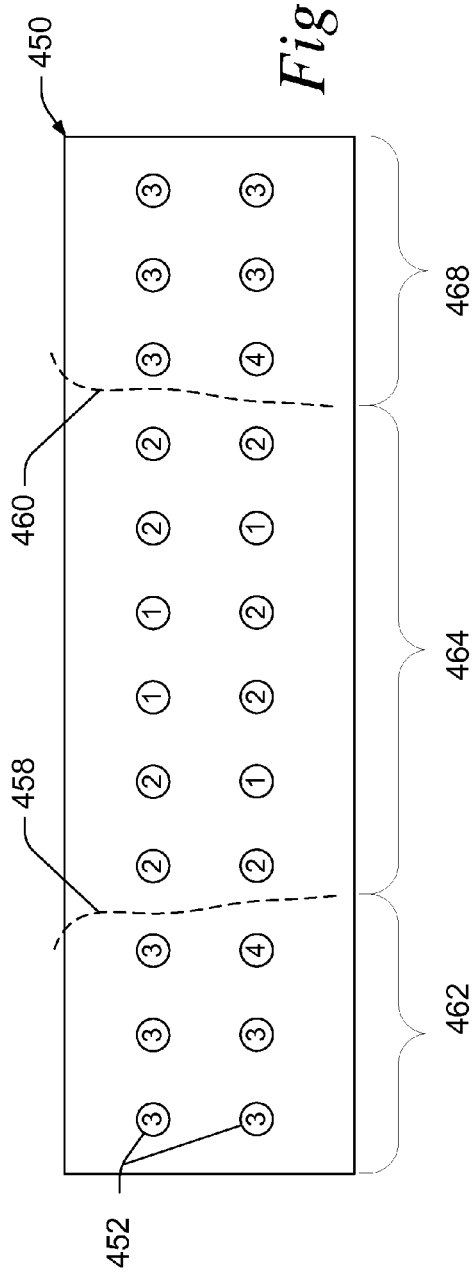

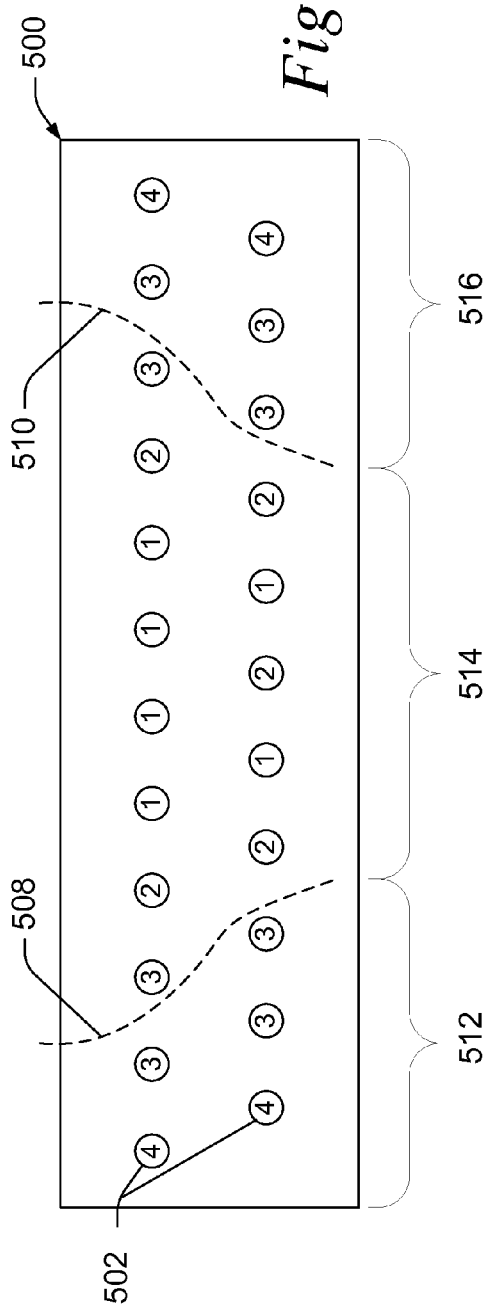

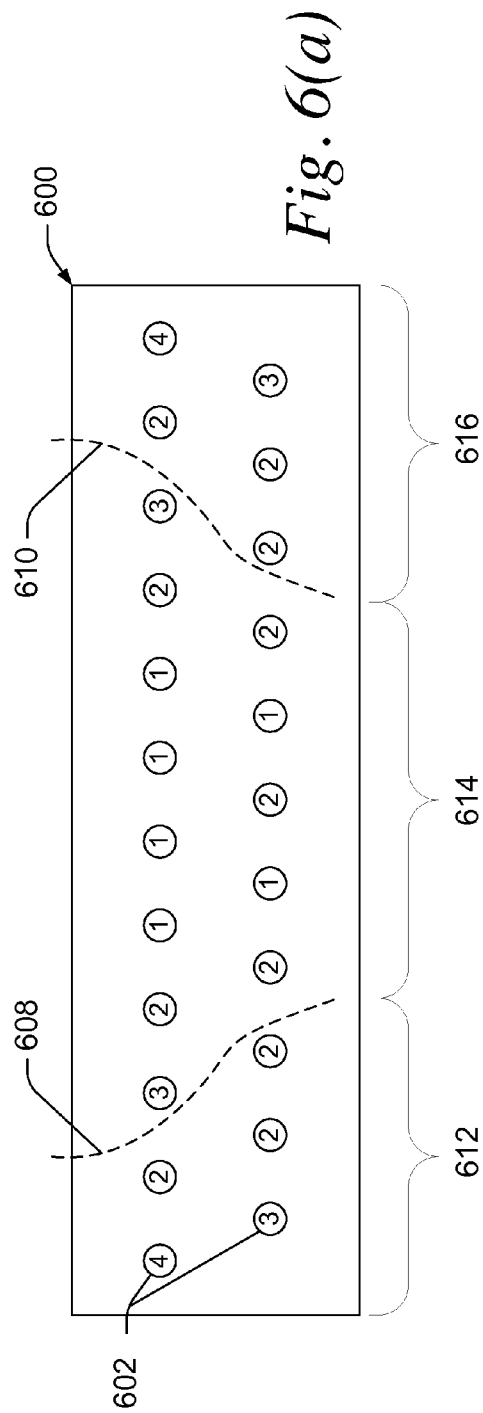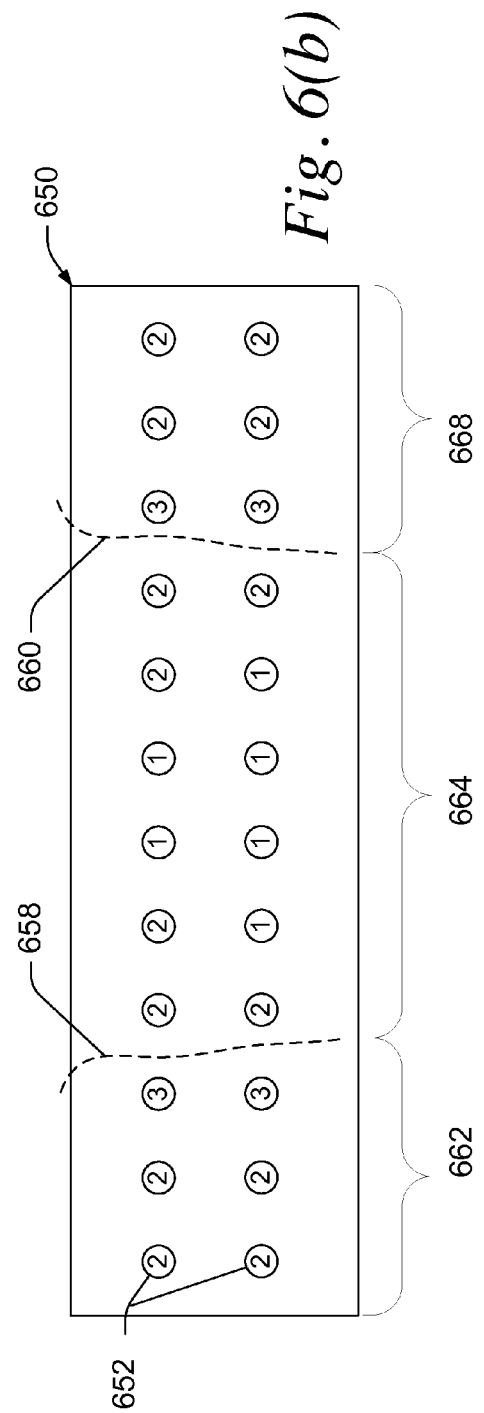

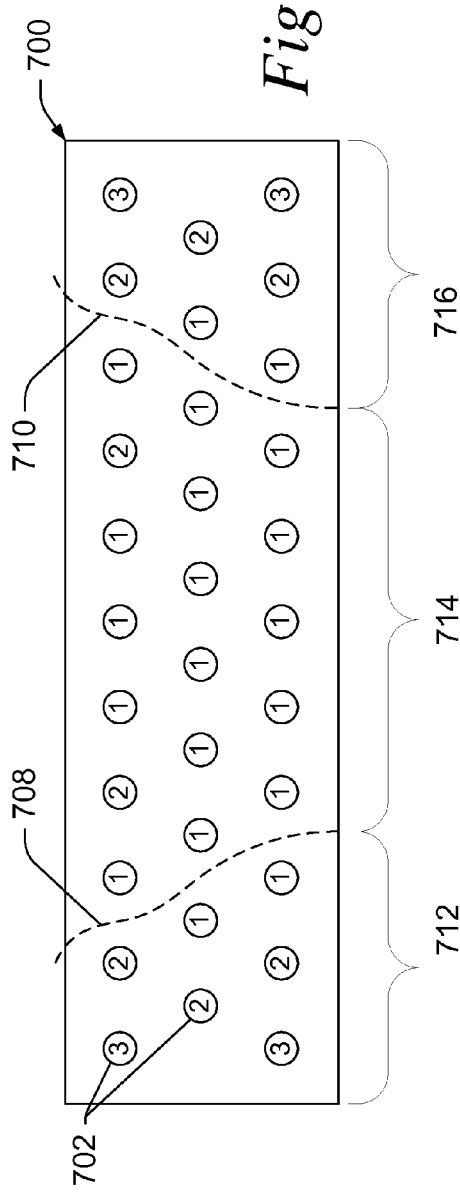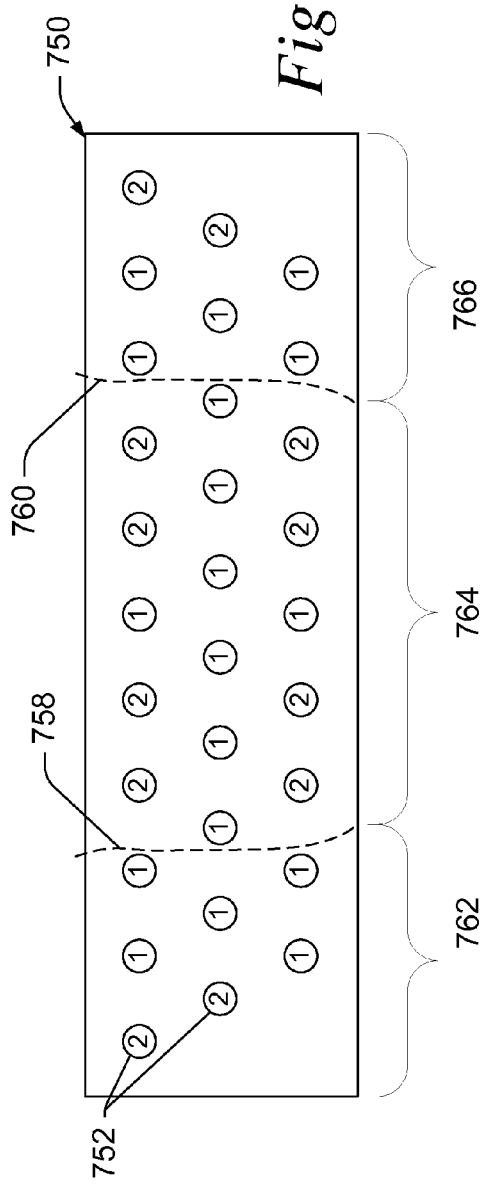

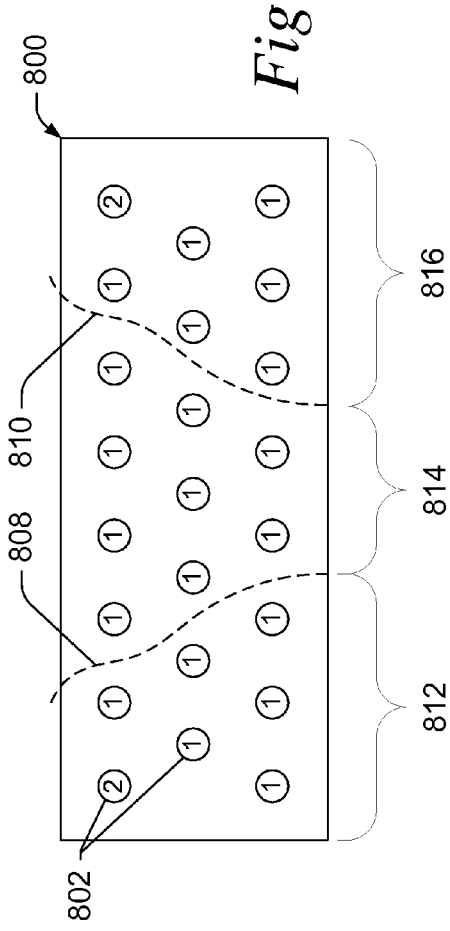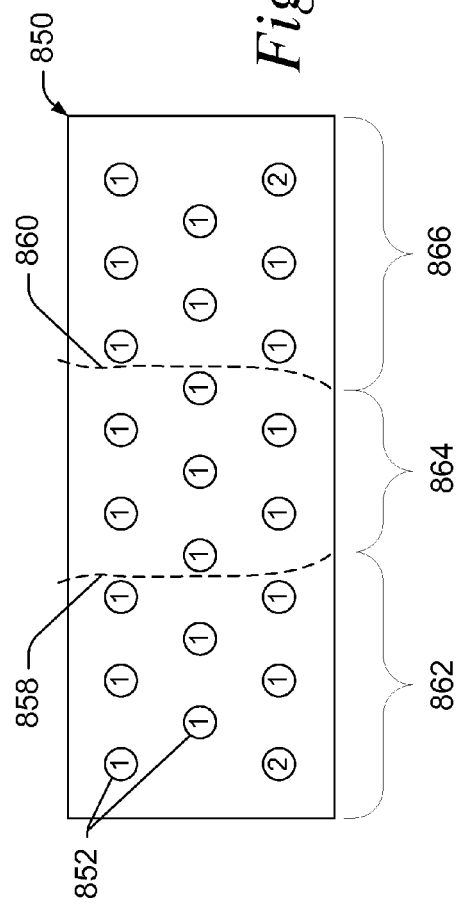

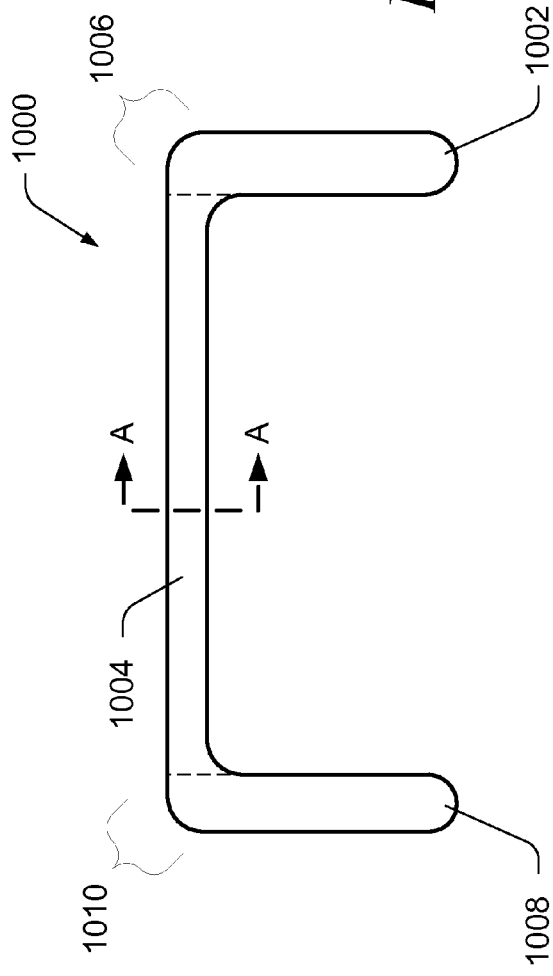
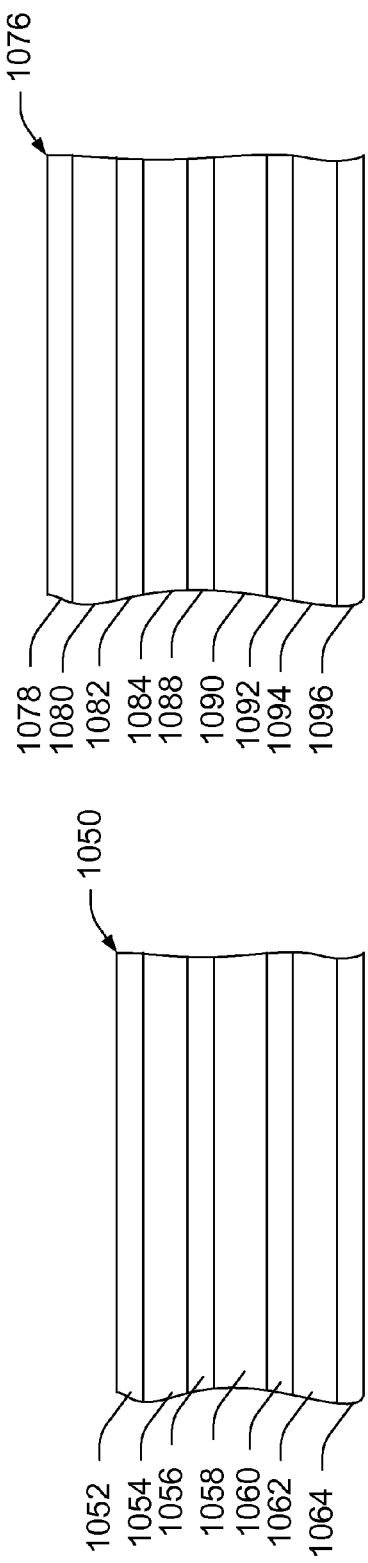

FIBERGLASS REINFORCED PLASTIC LIGHTWEIGHT HEAVY-DUTY LADDER AND METHOD OF MAKING SAME

CROSS REFERENCE TO RELATED APPLICATIONS

This application claims the benefit of U.S. Provisional Patent Application No. 61/714,577, filed Oct. 16, 2012, titled "Fiberglass Reinforced Plastic Lightweight Heavy-Duty Ladder and Method of Making Same" the entire contents of which are hereby incorporated by reference herein, for all purposes.

TECHNICAL FIELD

The present invention relates to fiberglass reinforced lightweight articles and more particularly to lightweight ladders incorporating fiberglass reinforced lightweight articles. The present invention further relates to a method of making fiberglass reinforced lightweight articles and more particularly to a process for making lightweight ladders incorporating fiberglass reinforced lightweight articles.

BACKGROUND OF THE INVENTION

Fiberglass reinforced materials, such as fiberglass reinforced plastic, fiber-reinforced plastic, and fiber-reinforced polymer, have long been used in a number of commercial and consumer applications. Among other attributes, fiberglass reinforced materials have a high strength to weight ratio, are relatively inexpensive, non-conductive, and non-corrosive. As such, components made from fiberglass reinforced materials are commonly found in vehicles, such as automobiles, boats and planes; pipes formed from fiberglass reinforced materials are used in many industrial processes; and fiberglass reinforced materials are used in structural applications, where it is commonly used to strengthen concrete and steel beams.

One common use for fiberglass reinforced materials is in the manufacture of ladders and other climbing products. Ladders are generally manufactured from wood, aluminum, fiberglass reinforced materials, or a combination thereof. The choice of ladder material depends on the intended use, the weight of the ladder, and cost. For example, wood ladders have significant variations in quality and are more susceptible to moisture and the elements as compared to aluminum and fiberglass ladders. Ladders constructed of aluminum are strong, durable, and lightweight, but conduct electricity. Ladders constructed from fiberglass reinforced materials, in addition to being strong and durable, are non-conductive. Prior art fiberglass reinforced ladders, however, are heavier than equivalent aluminum ladders (i.e., those having the same shape, size, and rating).

Because aluminum conducts electricity, aluminum ladders cannot be used near power lines or electrical wiring. As such, non-conductive fiberglass reinforced ladders are commonly used in these situations. However, traditional fiberglass reinforced ladders typically weigh 15% to 20% more than an equivalent aluminum ladder. This additional weight is undesirable and is a burden to the individuals transporting and using the ladder. For example, power company, cable company, and telephone company workers must load and unload the heavier fiberglass reinforced ladder for each installation or work assignment. In some cases, the heavier weight of the fiberglass reinforced ladder can contribute to fatigue or injuries.

Fiberglass reinforced ladders are traditionally manufactured by a pultrusion process. Prior art pultrusion processes involves impregnating reinforcing material with a resin, forming the resin coated reinforcing material into the desired shape with a die and curing the resin by the addition of heat.

Techniques have been developed to reduce the weight of fiberglass reinforced ladders made by prior art pultrusion processes. One such technique involves cutting a series of holes at regular locations along the length of the ladder rails. These holes are in addition to the holes formed for the purpose of mounting the rails. The reduction of material results in a reduction in the overall weight of the ladder. Companies, however, often label the ladder rails with the company name, a trademark, logo, or other content. The holes, while reducing weight, inhibit such labeling. The holes also introduce other problems, such as (i) reducing the structural integrity of the ladder, which can, over time, lead to a failure under load resulting in bodily injury or property damage, (ii) increasing cost as a result of the additional step in the manufacturing process to produce the holes, and (iii) increasing the complexity in the manufacturing process to properly align the holes so the rungs can be attached.

Accordingly, it would be an advance in the state of the art to develop a process to make a lightweight fiberglass reinforced ladder that can be made using traditional pultrusion manufacturing equipment and that has a weight near, or less than, that of an equivalent aluminum ladder, while retaining the shape, appearance and structural integrity of a fiberglass reinforced ladder made using traditional processes.

SUMMARY OF THE INVENTION

A method of making a lightweight heavy-duty ladder is presented. The method includes impregnating rovings with a resin system and forming the impregnated rovings into a set of rails. Each rail comprises a center portion, a left sidewall portion, and a right sidewall portion. The left sidewall portion and the right sidewall portion each have an article roving density at least 10% greater than that of the center portion. The method further comprises attaching a plurality of rungs between the set of rails.

A lightweight heavy-duty ladder is also presented. The ladder includes a set of rails. Each rail comprises a center portion, a left sidewall portion, and a right sidewall portion. A plurality of rovings, running longitudinally down the length of each rail, are embedded within each rail. The left sidewall portion and the right sidewall portion each have an article roving density at least 10% greater than that of the center portion. The ladder further comprises a plurality of rungs disposed between the set of rails.

BRIEF DESCRIPTION OF THE DRAWINGS

FIGS. 3(a) and 3(b) are drawings of exemplary upper and lower guide plates used in Applicant's pultrusion process to arrange roving material;

FIGS. 4(a) and 4(b) are drawings of exemplary upper and lower guide plates showing the number of rovings at each location for a 118 roving pultruded article;

FIGS. 5(a) and 5(b) are drawings of exemplary upper and lower guide plates showing the number of rovings at each location for a 110 roving pultruded article;

FIGS. 6(a) and 6(b) are drawings of exemplary upper and lower guide plates showing the number of rovings at each location for a 94 roving pultruded article;

FIGS. 7(a) and 7(b) are drawings of exemplary upper and lower guide plates showing the number of rovings at each location for a 90 roving pultruded article;

FIGS. 8(*a*) and 8(*b*) are drawings of exemplary upper and lower guide plates showing the number of rovings at each location for a 50 roving pultruded article;

FIG. 10(*a*) is a cross section of an exemplary article formed by Applicant's pultrusion process;

FIG. 10(*b*) is a drawing across cross section AA of FIG. 10(*a*) for a 7 layer pultruded article; and FIG. 10(*c*) is a drawing across cross section AA of FIG. 10(*a*) for a 9 layer pultruded article.

DETAILED DESCRIPTION OF SPECIFIC EMBODIMENTS

Applicant has developed a pultrusion process for manufacturing lightweight fiberglass reinforced plastic. In certain embodiments, Applicant's process results in a pultruded article having a non-uniform distribution of rovings along the transverse cross section of the pultruded article. Selectively strengthening the curved and/or sidewall portions of the pultrusion (for C-channel articles) by including additional rovings at select locations enables the creation of pultrusion articles that are lighter than articles produced by prior art processes. In various embodiments, Applicant's process involves the use of a filler-free resin system and/or a resin system comprising microspheres. Applicant's process results in a fiberglass reinforced ladder with a weight equivalent to, or less than, that of an aluminum ladder having substantially the same size and shape, but with the strength and appearance of a traditional fiberglass ladder. Applicant's process also enables the production of lightweight articles using the same equipment used in traditional pultrusion processes.

The lightweight plastic made from the various embodiments of Applicant's process as described herein can be used to make any type of ladder. It is, however, particularly desirable to reduce the weight of heavy-duty ladders as those types of ladders have the greatest weight. As such, the plastic resulting from Applicant's process is particularly useful in creating lightweight heavy-duty ladders and other types of large and/or heavy capacity ladders.

Figure 1:
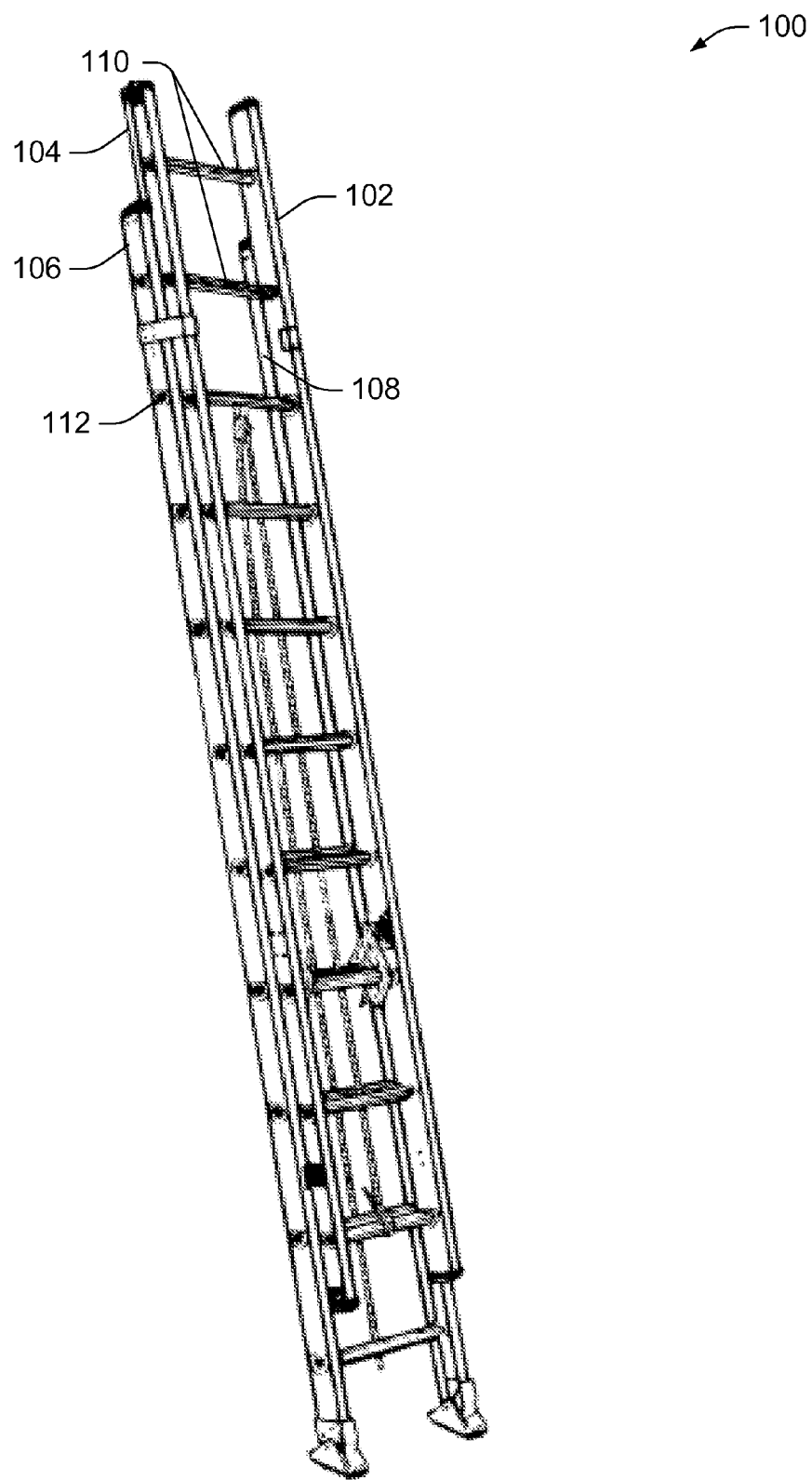
FIG. 1 is an exemplary embodiment of a lightweight heavy-duty ladder formed from Applicant's process.

Referring to FIG. 1, an exemplary lightweight ladder 100 produced by Applicant's process is depicted. Although ladder 100 has the same general appearance as a typical ladder made from conventional pultrusion processes, ladder 100 weighs significantly less.

Table 1 below provides a comparison of various embodiments of Applicant's Type 1A (300 pound rated) ladder as compared to existing Type 1A ladders made from traditional aluminum and prior art fiberglass processes.

weigh between 17 percent and 27 percent less than prior art ladders. In addition, the Type 1A ladders produced by Applicant's lightweight fiberglass reinforced material weigh between 5 percent and 10 percent less than traditional aluminum ladders.

To form one embodiment of a lightweight ladder 100, long C-channel sections are created by Applicant's pultrusion process and cut to the desired length to form rails 102/104 and 106/108. In one embodiment, a hole 112 is punched every 12 inches along the length of the rails 102/104 and 106/108. A plurality of rungs 110 are disposed between a pair of rails and aligned with corresponding holes 112 on each rail. The rungs 110 are disposed within the holes 112 and fastened to the rails 102/104 and 106/108 using a rung to rail assembly or a clamping machine (for aluminum rungs) or glue (for fiberglass rungs). In one embodiment, the rungs 110 are formed from aluminum. In other embodiments, the rungs 110 are formed from wood or a reinforced synthetic material.

In another embodiment, each end of each rung 110 is attached to one side of a plate. The opposite side of the plate is attached to a rail. In this embodiment, the rungs 110 are attached to the rails 102/104 and 106/108 without the need to form mounting holes 112.

In different embodiments, the ladder 100 is a Type III (with a load rating of 200 lbs), Type II (with a load rating of 225 lbs), Type I (with a load rating of 250 lbs), Type IA (with a load rating of 300 lbs), Type IAA (with a load rating of 375 lbs), or a special duty ladder (with a load rating of 500 lbs). In some embodiments, the ladder 100 is a step ladder, a trestle ladder, a shelf ladder, a platform ladder, a single ladder, a combination ladder, or an extension ladder.

In one embodiment, the rails 102/104 and 106/108 comprise between 2 and 4 fiberglass mats and a plurality of rovings integrated in a plastic resin system. The plurality of rovings are non-uniformly distributed transversely along the cross section of each rail. The particular distribution of the rovings are selected based on the final cross section of the pultruded article to strengthen the portions of the rail that are subject to the greatest stress during normal use.

In one embodiment, the resin system used to form rails 102/104 and 106/108 is filler-free (i.e., contains no filler material or an insignificant amount of filler material). An example of filler material is calcium carbonate. In one embodiment, the resin system comprises between 0 and 10 weight percent filler, the exact percentage selected based on the desired strength to weight ratio of the rail. In one embodiment, the resin system comprises up to 10 weight percent hollow microspheres, the exact percentage selected based on the strength to weight ratio of the rail.

TABLE 1

| Ladder Size (feet) | Prior art fiberglass ladders (pounds) | Applicant's ladders incorporating lightweight fiberglass rails (pounds) | Reduction in weight of Applicant's ladder compared to prior art fiberglass ladder | Traditional aluminum ladders (pounds) | Reduction in weight of Applicant's ladder compared to traditional aluminum ladder |
|---|---|---|---|---|---|
| 16 | 37 | 27 | 27% | 30 | 10% |
| 20 | 42 | 34 | 19% | 36 | 6% |
| 24 | 52 | 42 | 19% | 44 | 5% |
| 28 | 60 | 50 | 17% | 55 | 9% |

Figure 2:
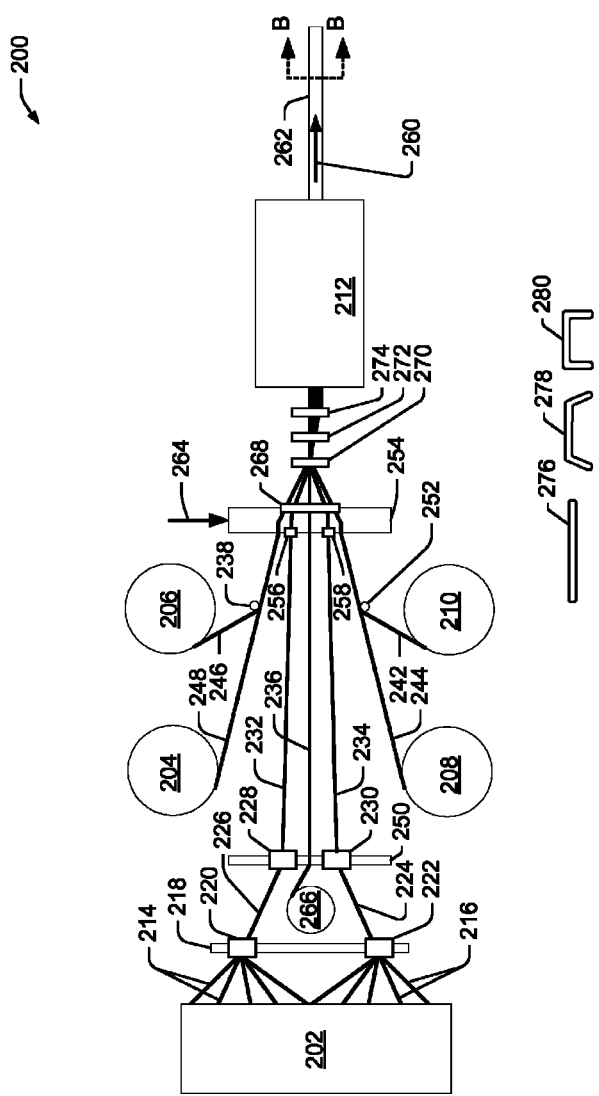
FIG. 2 is a schematic diagram of an exemplary pultrusion process for making Applicant's fiberglass reinforced lightweight plastic.

As shown in Table 1 above, the Type 1A ladders produced by Applicant's lightweight fiberglass reinforced material Referring to FIG. 2, a schematic diagram 200 of one embodiment of Applicant's pultrusion process is depicted. A cabinet 202 holds a plurality of roving spools. In one embodiment, each roving is formed from a bundle of a plurality of individual fiberglass filaments. In various embodiments, the rovings used in Applicant's process have a size of between 90 to 450 linear yards per pound. In one embodiment, the rovings used have a size of 113 linear yards per pound.

A plurality of roving sets 214 and 216 from the plurality of spools is fed into a guide assembly 218. The guide assembly 218 comprises an upper guide plate 220 and a lower guide plate 222. A first set of rovings 214 is fed into the upper guide plate 220. A second set of rovings 216 is fed into the lower guide plate 222. The guide assembly 218 keeps the rovings aligned and prevents the rovings from becoming tangled.

A plurality of rovings 226 and 224 are fed into a second guide assembly 250. The guide assembly 250 comprises an upper guide plate 228 and a lower guide plate 230. The rovings 226 are fed into guide plate 228 and the rovings 224 are fed into guide plate 230.

A first fiberglass mat 236 is fed from a spool 266 into the guide assembly 250. In various embodiments, the fiberglass mat 236 comprises a continuous filament fiberglass sheet with a weight of between about 0.75 and about 3 oz. The guide assembly 250 aligns the rovings 226, the rovings 224, and the fiberglass mat 236 for the next step in the process.

A second fiberglass mat 248 is fed from a spool 204 and over roller 238. In various embodiments, the fiberglass mat 248 comprises a continuous filament fiberglass sheet with a weight of between about 0.75 and about 3 oz.

A first veil 246 is fed from spool 206, over roller 238 where it contacts fiberglass mat 248. In various embodiments, the veil 246 is dyed, printed, transfer coated or pigmented to add aesthetic features to the rail. In various embodiments, the veil 246 is made from polyester, glass, paper or other materials known by those skilled in the art.

A third fiberglass mat 244 is fed from a spool 208 and over roller 252. In various embodiments, the fiberglass mat 244 comprises a continuous filament fiberglass sheet with a weight of between about 0.75 and about 3 oz.

A second veil 242 is fed from spool 210, over roller 252 where it contacts the fiberglass mat 244. In various embodiments, the veil 242 is dyed, printed, transfer coated or pigmented to add aesthetic features to the rail. In various embodiments, the veil 242 is made from polyester, glass, paper or other materials known by those of ordinary skill in the art.

The rovings 232, rovings 234, the fiberglass mat 236, the fiberglass mat 248, the fiberglass mat 244, the veil 246, and the veil 242 are fed into a resin bath assembly 254. The resin bath assembly 254 comprises an upper guide plate 256 and a lower guide plate 258. The rovings 232 are fed into the resin bath 254 through the upper guide plate 256 and the rovings 234 are fed into the resin bath 254 through the lower guide plate 258. Liquid resin is fed into the resin bath 254 as indicated by arrow 264. The resin soaks into and impregnates the rovings, fiberglass mats, and veils. Embodiments of various resin systems used in Applicant's process are provided in Table 2 below.

TABLE 2

Exemplary Resin Systems

| Resin System Component | Weight Percentage |
|---|---|
| Polymer | about 80% to about 95% |
| Microspheres | 0% to about 10% |
| Filler | 0% to about 10% |
| Additives | about 4.9% to about 5.4% |

The polymer component comprises the largest percentage of the resin system. In various embodiments, the polymer component is polyester, vinyl ester, acrylic, epoxy, urethane, acrylate, or a combination thereof.

The microsphere component is an additive that comprises hollow micron sized spheres that reduce the overall weight (by volume) of the resin system. In various embodiments, the microspheres have a mean size between about 50 to about 90 microns and a density between about 0.08 to about 0.48 g/cm$^3$.

The filler component is an additive typically used to reduce the cost of the rail. In various embodiments, the filler is calcium carbonate, aluminum silicate, or a combination thereof.

In one embodiment, the additive component comprises a texture additive, UV stabilizer, mold lubricant, pigment, and initiator, although other additives known in the art may be used.

Texture additives are known in the art to improve surface smoothness and controls shrinkage. In one embodiment, the texture additive is a polymer mixture comprising unsaturated polyester and styrene and makes up about 0.9 weight percent of the resin system.

UV stabilizers, or light stabilizers, are known in the art to protect the polymer in the final pultruded article from degradation due to exposure to sunlight. In various embodiments, the UV stabilizer makes up about 0.4 weight percent to about 0.6 weight percent of the resin system.

Mold lubricants are known in the art to aid the pultrusion process. In various embodiments, the mold lubricant comprises organic phosphate esters and fatty acids and makes up about 0.9 weight percent of the resin system.

Pigment additives are known in the art to add color to the final pultruded product. In various embodiments, the pigment additive makes up about 1.7 weight percent to about 2 weight percent of the resin system.

Initiator additives are catalysts known in the art to accelerate hardening of the resin during the curing step. The choice of initiator will depend on the particular polymer used. In one embodiment, the initiator makes up about 1 weight percent of the resin system.

In some embodiments, the resin system is filler-free and comprises 94 weight percent polyester polymer and 6 weight percent additives. In one embodiment, the additive comprises 18 weight percent texture additive, 9 weight percent UV stabilizer, 18 weight percent mold lubricant, 34 weight percent pigment, and 21 weight percent initiator.

In some embodiments, the resin system has a low filler content and comprises 89 weight percent polyester polymer, 6 weight percent calcium carbonate filler, and 5 weight percent additives. In one embodiment, the additive comprises 18 weight percent texture additive, 9 weight percent UV stabilizer, 18 weight percent mold lubricant, 34 weight percent pigment, and 21 weight percent initiator.

In some embodiments, the resin system comprises 85 weight percent polyester polymer, 7 weight percent microspheres, 3 weight percent filler, and 5 weight percent additives. In one embodiment, the additive comprises 18 weight percent texture additive, 9 weight percent UV stabilizer, 18 weight percent mold lubricant, 34 weight percent pigment, and 21 weight percent initiator.

The resin-impregnated component stack, consisting of the rovings, mats and veils, exit the resin bath 254 through the pre-forming guide plate 268. In one embodiment, the resin-impregnated component passes through a series of forming dies 270, 272 and 274. The forming dies 270, 272, 274 shape the resin-impregnated component stack before the stack passes into the curing assembly 212. In this embodiment, the resin-impregnated component stack has the cross section 276 after passing through forming die 270, the cross section 278 after passing through forming die 272, and the cross section 280 after passing through forming die 274.

After the material is formed, the curing assembly 212 heats the resin-impregnated component stack to cure the resin. In different embodiments, the shaped stack is heated to between about 250° F. to about 400° F. During heating, the resin in and around the fiberglass mats, rovings, and veils undergoes polymerization to form a polymer matrix. The hardened fiberglass reinforced polymer article 262 emerges from the curing assembly 212.

The rovings, mats, veils, and resin are pulled through the process by a force applied to the article 262, which pulls the material from the various spools and through the resin bath 254 and curing assembly 212 as indicated by arrow 260.

Referring to FIG. 3(a) a drawing of an exemplary upper guide plate 300 used to direct the rovings into a resin bath is depicted. The upper guide plate 300 is represented on FIG. 2 as guide plate 256. A plurality of holes 302 are formed in the guide plate 300. In one embodiment, the holes 302 are arranged in two horizontal rows that are staggered relative to each other. One or more rovings are fed into each of the plurality of holes 302. The holes align each roving and guide it into a particular position along the width of the pultruded material.

Rovings that pass through holes to the left of dashed line 304 will form part of the left sidewall of the pultruded article, as depicted by portion 1008 in FIG. 10(a). Rovings that pass through holes to the right of dashed line 306 will form part of the right sidewall of the pultruded article, as depicted by portion 1002 in FIG. 10(a). Rovings that pass through the holes between dashed line 304 and dashed line 308 will form the left corner portion of the pultruded article, as depicted by portion 1010 in FIG. 10(a). Rovings that pass through the holes between dashed line 306 and dashed line 310 will form the right corner portion of the pultruded article, as depicted by portion 1006 in FIG. 10(a). Rovings that pass through holes between dashed line 308 and dashed line 310 will form the center portion of the pultruded article, as depicted by portion 1004 in FIG. 10(a).

Referring to FIG. 3(b), a drawing of an exemplary lower guide plate 350 used to direct the rovings into a resin bath is depicted. The lower guide plate 350 is represented on FIG. 2 as guide plate 258. Guide plate 350 is similar to guide plate 300, in that rovings that pass through holes 352 to the left of 354 and to the right of 356 will form part of the left sidewall and right sidewall, respectively, and the rovings that pass through holes 352 between 354 and 356 will form the center portion of the pultruded article. Guide plate 350 is, however, in this embodiment, narrower and contains fewer holes than guide plate 300. The rovings that pass through guide plate 350 will form the interior portion of the formed pultruded article (i.e., along the concave portion of the C-channel member depicted in FIG. 10(a)). Whereas the rovings that pass through the guide plate 300 will form the outer portion of the formed pultruded article (i.e., along the convex portion of the C-channel member depicted in FIG. 10(a)).

Portions of the pultruded article can be selectively strengthened by adding additional rovings to select holes in the plurality of holes 302 and 352. By adding additional roving to the proper holes (as determined by the final shape of the pultruded article), a lightweight, yet durable member can be produced.

In some embodiments, the rails comprise a non-uniform distribution of rovings along the transverse cross section of the pultruded article. In some embodiments, the rails comprise a non-uniform distribution of rovings along the transverse cross section of the pultruded article and a filler-free resin system. In some embodiments, the rails comprise a non-uniform distribution of rovings along the transverse cross section of the pultruded article and a microsphere resin system. In some embodiments, the rails comprise a non-uniform distribution of rovings along the transverse cross section of the pultruded article and a filler-free resin system comprising microspheres.

In one embodiment, lightweight, yet high strength, fiberglass reinforced ladder rails were formed from a filler-free resin system by increasing the relative number of rovings within certain portions of the fiberglass reinforced member. The ladder rails have a weight equivalent to, or less than, that of equivalent aluminum ladders and less than that of equivalent fiberglass reinforced ladders made by traditional processes, yet satisfy structural performance for climbing products as measured by the American National Standards Institute requirements for portable reinforced plastic ladders, ANSI A14.5, incorporated by reference herein, and OSHA testing and safety requirements. The ladder rails produced by Applicant's process weigh about 15% to about 30% less than ladder rails of equivalent size and shape produced from conventional pultrusion processes.

In certain embodiments, the average number of rovings fed into each hole adjacent to dashed lines 304, 306, 354, and 356 is larger than the average number of rovings fed into each hole between dashed lines 308 and 310. This strengthens the corner portion of the member and the sidewalls relative to the center portion (as depicted in FIG. 10(a)).

In certain embodiments, the average number of rovings fed into each hole to the left of dashed line 304 and 354 is larger than the average number of rovings fed into each hole between dashed lines 308/310 and dashed lines 354/356. In certain embodiments, the average number of rovings fed into each hole to the right of dashed line 306 and 356 is larger than the average number of rovings fed into each hole between dashed lines 308/310 and dashed lines 354/356. This increases the relative strength of the sidewalls, as depicted by portions 1002 and 1008 of FIG. 10(a).

In various embodiments of C-channel rails made from Applicant's process, the roving density is greater in the sidewalls of the pultruded article than in the center portion of the pultruded article. Roving density can be represented as "article roving density" or "guide plate roving density." Article roving density is defined as the ratio of the number of rovings per given length along the cross section of the pultruded article. As such, the article roving density of the rail sidewall is calculated by the number of rovings in the sidewall over the length of the sidewall along its cross section. Similarly, the article roving density of the center portion of the rail is calculated by the number of rovings in the center portion over the length of the center portion along its cross section. In various embodiments, the article roving density in at least one sidewall is at least about 20% greater than the article roving density of the center portion. In various embodiments, the article roving density in at least one sidewall is between about 20% and about 250% greater than the article roving density of the center portion.

Guide plate roving density is defined as the ratio of the number of rovings over the number of insertion points. An insertion point would correspond to one of the holes 302/352. For example, if the holes 302/352 to the left of dashed line 308 and dashed line 354 (10 holes in total, which together will form part of one sidewall of the pultruded article) each had 2 rovings, the guide plate roving density would be 20/10=2.

In various embodiments, the guide plate roving density in at least one sidewall is at least 10% greater than the guide plate roving density of the center portion. In various embodiments, the guide plate roving density in at least one sidewall is between about 10% to about 150% greater than the guide plate roving density of the center portion.

Referring to FIG. 4(a), a drawing of an exemplary upper guide plate 400, showing the number of rovings at each insertion point (i.e., one of the plurality of holes 402), is depicted. The guide plate 400 corresponds to the upper guide plate 256 in FIG. 2. A plurality of holes 402 are formed in the guide plate 400. The number in each hole 402 indicates the number of rovings inserted through that insertion point. Rovings inserted through the holes in section 412 of the upper guide plate 400 (to the left of dashed line 408) will form the corner and sidewall portions of the pultruded article, as depicted by portion 1010 and 1008 of FIG. 10(a). Rovings inserted through the holes in section 414 of the upper guide plate 400 (between dashed line 408 and dashed line 410) will form the center portion of the pultruded article, as depicted by portion 1004 in FIG. 10(a). Rovings inserted through the holes in section 416 (to the right of dashed line 410) will form the corner and sidewall portions of the pultruded article, as depicted by portion 1006 and 1002 in FIG. 10(a).

Referring to FIG. 4(b), a drawing of an exemplary lower guide plate 450, showing the number of rovings at each location, is depicted. The lower guide plate 450 corresponds to the lower guide plate 258 in FIG. 2. A plurality of holes 452 are formed in the lower guide plate 450. In one embodiment, the holes 452 are arranged in two horizontal rows. The number in each hole 452 indicates the number of rovings inserted through that insertion point.

Rovings inserted through the holes in section 462 of the lower guide plate 450 (to the left of dashed line 458) will form the corner and sidewall portions of the pultruded article, as depicted by portion 1010 and 1008 in FIG. 10(a). Rovings inserted through the holes in section 464 of the lower guide plate (between dashed line 458 and dashed line 460) will form the center portion of the pultruded article, as depicted by portion 1004 in FIG. 10(a). Rovings inserted through the holes in section 468 of the lower guide plate (to the right of dashed line 460) will form the corner and sidewall portions of the pultruded article, as depicted by portion 1006 and 1002 in FIG. 10(a).

The rovings inserted through the upper guide plate 400 and lower guide plate 450 will form different portions of the same pultruded article. The rovings inserted through the upper guide plate 400 will form part of the outer portion of the pultruded article (i.e., the portion near the convex surface of the C-channel member depicted in FIG. 10(a)). The rovings inserted through the lower guide plate 450 will form part of the interior portion of the pultruded article (i.e., the portion near the concave surface of the C-channel member depicted in FIG. 10(a)).

Sections 412 and 462 contain a total of 35 rovings in 11 holes (i.e., insertion points). As such, the guide plate roving density for these sections is 35/11=3.18. Furthermore, because the rovings in sections 412 and 462 will form part of the left sidewall of the pultruded article, portion 1008 in FIG. 10(a), the guide plate roving density for the sidewall is therefore 3.18. Sections 416 and 468 is a mirror image of sections 412 and 462, therefore the right sidewall of the pultruded article, portion 1002 in FIG. 10(a), has the same guide plate roving density of 3.18.

Section 414 and 464 contain a total of 48 rovings in 25 holes. As such, the guide plate roving density for this section is 48/25=1.92. Furthermore, because the rovings in sections 414 and 464 will form part of the center portion of the pultruded article, portion 1004 in FIG. 10(a), the guide plate roving density for the center portion of the pultruded article is therefore 1.92.

A pultruded article produced using the guide plates 400 and 450, and associated roving counts, would therefore have sidewalls and corners with a guide plate roving density 66% greater than the guide plate roving density of the center portion.

The total number of rovings in a pultruded article formed using guide plates 400 and 450, with the configuration depicted in FIGS. 4(a) and 4(b), is 118. In various embodiments, using guide plates 400 and 450, or other guide plate layouts, the total number of rovings in the final pultruded article is between 20 and 200.

Referring to FIG. 5(a), a drawing of an exemplary upper guide plate 500, showing the number of rovings at each insertion point (i.e., hole 502 or 552), is depicted. The guide plate 500 corresponds to the upper guide plate 256 in FIG. 2. A plurality of holes 502 are formed in the guide plate 500. The number in each hole 502 indicates the number of rovings inserted through that insertion point. Rovings inserted through the holes in section 512 of the upper guide plate 500 (to the left of dashed line 508) will form the corner and sidewall portions of the pultruded article, as depicted by portion 1010 and 1008 of FIG. 10(a). Rovings inserted through the holes in section 514 of the upper guide plate 500 (between dashed line 508 and dashed line 510) will form the center portion of the pultruded article, as depicted by portion 1004 in FIG. 10(a). Rovings inserted through the holes in section 516 (to the right of dashed line 510) will form the corner and sidewall portions of the pultruded article, as depicted by portion 1006 and 1002 in FIG. 10(a).

Referring to FIG. 5(b), a drawing of an exemplary lower guide plate 550, showing the number of rovings at each location, is depicted. The lower guide plate 550 corresponds to the lower guide plate 258 in FIG. 2. A plurality of holes 552 are formed in the lower guide plate 550. The number in each hole 552 indicates the number of rovings inserted through that insertion point. In one embodiment, the holes 552 are arranged in two horizontal rows.

Rovings inserted through the holes in section 562 of the lower guide plate 550 (to the left of dashed line 558) will form the corner and sidewall portions of the pultruded article, as depicted by portion 1010 and 1008 in FIG. 10(a). Rovings inserted through the holes in section 564 of the lower guide plate (between dashed line 558 and dashed line 560) will form the center portion of the pultruded article, as depicted by portion 1004 in FIG. 10(a). Rovings inserted through the holes in section 568 of the lower guide plate (to the right of dashed line 560) will form the corner and sidewall portions of the pultruded article, as depicted by portion 1006 and 1002 in FIG. 10(a).

The rovings inserted through the upper guide plate 500 and lower guide plate 550 will form different portions of the same pultruded article. The rovings inserted through the upper guide plate 500 will form part of the outer portion of the pultruded article (i.e., the portion near the convex surface of the C-channel member depicted in FIG. 10(a)). The rovings inserted through the lower guide plate 550 will form part of the interior portion of the pultruded article (i.e., the portion near the concave surface of the C-channel member depicted in FIG. 10(a)).

Sections 512 and 562 contain a total of 35 rovings in 11 holes (i.e., insertion points). As such, the guide plate roving density for these sections is 35/11=3.18. Furthermore, because the rovings in sections 512 and 562 will form part of the left sidewall of the pultruded article, portion 1008 in FIG. 10(a), the guide plate roving density for the sidewall is therefore 3.18. Sections 516 and 568 is a mirror image of sections 512 and 562, therefore the right sidewall of the pultruded article, portion 1002 in FIG. 10(a), has the same guide plate roving density of 3.18.

Section 514 and 564 contain a total of 40 rovings in 25 holes. As such, the guide plate roving density for this section is 40/25=1.60. Furthermore, because the rovings in sections 514 and 564 will form part of the center portion of the pultruded article, portion 1004 in FIG. 10(a), the guide plate roving density for the center portion of the pultruded article is therefore 1.60.

A pultruded article produced using the guide plates 500 and 550, and associated roving counts, would therefore have sidewalls and corners with a guide plate roving density 99% greater than the guide plate roving density of the center portion.

The total number of rovings in a pultruded article formed using guide plates 500 and 550, with the configuration depicted in FIGS. 5(a) and 5(b), is 110.

Referring to FIG. 6(a), a drawing of another exemplary upper guide plate 600, showing the number of rovings at each location, is depicted. The upper guide plate 600 corresponds to the upper guide plate 256 in FIG. 2 and has the same layout of holes 602 as upper guide plate 500 of FIG. 5. In addition, dashed lines 608 and 610 identify, in the same manner as described in the description related to FIG. 5, the separation between the roving sets that will form part of the sidewalls and corners and part of the center portion.

Referring to FIG. 6(b), a drawing of an exemplary lower guide plate 650, showing the number of rovings at each location, is depicted. The lower guide plate 650 corresponds to the lower guide plate 258 in FIG. 2 and has the same layout of holes 602 as lower guide plate 550 of FIG. 5. In addition, dashed lines 658 and 660 identify, in the same manner as described in the description related to FIG. 5, the separation between the roving sets that will form part of the sidewalls and corners and part of the center portion.

Sections 612 and 662 contain a total of 27 rovings in 11 holes (i.e., insertion points). As such, the guide plate roving density for these sections is 27/11=2.45. Furthermore, because the rovings in sections 612 and 662 will form part of the left sidewall of the pultruded article, portion 1008 in FIG. 10(a), the guide plate roving density for the sidewall is therefore 2.45. Sections 616 and 668 is a mirror image of sections 612 and 662, therefore the right sidewall of the pultruded article, portion 1002 in FIG. 10(a), has the same guide plate roving density of 2.45.

Section 614 and 664 contain a total of 40 rovings in 25 holes. As such, the guide plate roving density for this section is 40/25=1.60. Furthermore, because the rovings in sections 614 and 664 will form part of the center portion of the pultruded article, portion 1004 in FIG. 10(a), the guide plate roving density for the center portion of the pultruded article is therefore 1.60.

A pultruded article produced using the guide plates 600 and 650, and associated roving counts, would therefore have sidewalls with a guide plate roving density 53% greater than the guide plate roving density of the center portion.

The total number of rovings in a pultruded article formed using guide plates 600 and 650, with the configuration depicted in FIGS. 6(a) and 6(b), is 94.

Referring to FIG. 7(a), a drawing of an exemplary upper guide plate 700, showing the number of rovings at each location, is depicted. The guide plate 700 corresponds to the upper guide plate 256 in FIG. 2. A plurality of holes 702 are formed in the guide plate 700 in three staggered rows. Rovings inserted through the holes in section 712 of the upper guide plate 700 (to the left of dashed line 708) will form part of the corner and sidewall portions of the pultruded article, as depicted by portion 1010 and 1008 in FIG. 10(a). Rovings inserted through the holes in section 714 of the upper guide plate (between dashed line 708 and dashed line 710) will form part of the center portion of the pultruded article, as depicted by portion 1004 in FIG. 10(a). Rovings inserted through the holes in section 716 (to the right of dashed line 710) will form part of the corner and sidewall portions of the pultruded article, as depicted by portion 1006 and 1002 in FIG. 10(a).

Referring to FIG. 7(b), a drawing of an exemplary lower guide plate 750, showing the number of rovings at each location, is depicted. The lower guide plate 750 corresponds to the lower guide plate 258 in FIG. 2. A plurality of holes 752 are formed in the lower guide plate 750. In one embodiment, the holes 752 are arranged in three horizontal rows.

Rovings inserted through the holes in section 762 of the lower guide plate 750 (to the left of dashed line 758) will form part of the corner and sidewall portions of the pultruded article, as depicted by portion 1010 and 1008 in FIG. 10(a). Rovings inserted through the holes in section 764 of the lower guide plate (between dashed line 758 and dashed line 760) will form part of the center portion of the pultruded article, as depicted by portion 1004 in FIG. 10(a). Rovings inserted through the holes in section 766 (to the right of dashed line 760) will form the corner and sidewall portions of the pultruded article, as depicted by portion 1006 and 1002 in FIG. 10(a).

The rovings inserted through the upper guide plate 700 and lower guide plate 750 will form different portions of the same pultruded article. The rovings inserted through the upper guide plate 700 will form part of the outer portion of the pultruded article (i.e., the portion near the convex surface of the C-channel member depicted in FIG. 10(a)). The rovings inserted through the lower guide plate 750 will form part of the interior portion of the pultruded article (i.e., the portion near the concave surface of the C-channel member depicted in FIG. 10(a)).

Sections 712 and 762 contain a total of 23 rovings in 14 holes (i.e., insertion points). As such, the guide plate roving density for these sections is 23/14=1.64. Furthermore, because the rovings in sections 712 and 762 will form part of the left sidewall of the pultruded article, portion 1008 in FIG. 10(a), the guide plate roving density for the sidewall is therefore 1.64. Sections 716 and 768 is a mirror image of sections 712 and 762, therefore the right sidewall of the pultruded article, portion 1002 in FIG. 10(a), has the same guide plate roving density of 1.64.

Section 714 and 764 contain a total of 44 rovings in 34 holes. As such, the guide plate roving density for this section is 44/34=1.29. Furthermore, because the rovings in sections 714 and 764 will form part of the center portion of the pultruded article, portion 1004 in FIG. 10(a), the guide plate roving density for the center portion of the pultruded article is therefore 1.29.

A pultruded article produced using the guide plates 700 and 750, and associated roving counts, would therefore have sidewalls with a guide plate roving density 27% greater than the guide plate roving density of the center portion.

The total number of rovings in a pultruded article formed using guide plates 700 and 750, with the configuration depicted in FIGS. 7(a) and 7(b), is 90.

Referring to FIG. 8(a), a drawing of another exemplary upper guide plate 800, showing the number of rovings at each location, is depicted. The upper guide plate 800 corresponds to the upper guide plate 256 in FIG. 2 and has the same basic layout of holes 702 as upper guide plate 700 of FIG. 7, except that the number of holes in each horizontal row is reduced. In addition, dashed lines 808 and 810 identify, in the same manner as described in the description related to FIG. 7, the separation between the roving sets that will form part of the sidewalls and part of the center portion.

Referring to FIG. 8(b), a drawing of an exemplary lower guide plate 850, showing the number of rovings at each location, is depicted. The lower guide plate 850 corresponds to the lower guide plate 258 in FIG. 2 and has the same layout of holes 802 as lower guide plate 750 of FIG. 7, except that the number of holes in each horizontal row is reduced. In addition, dashed lines 858 and 860 identify, in the same manner as described in the description related to FIG. 7, the separation between the roving sets that will form part of the sidewalls and part of the center portion.

Sections 812 and 862 contain a total of 17 rovings in 15 holes (i.e., insertion points). As such, the guide plate roving density for these sections is 17/15=1.13. Furthermore, because the rovings in sections 812 and 862 will form part of the left sidewall of the pultruded article, portion 1008 in FIG. 10(a), the guide plate roving density for the sidewall is therefore 1.13. Sections 816 and 868 is a mirror image of sections 812 and 862, therefore the right sidewall of the pultruded article, portion 1002 in FIG. 10(a), has the same guide plate roving density of 1.13.

Section 814 and 864 contain a total of 16 rovings in 16 holes. As such, the guide plate roving density for this section is 16/16=1.00. Furthermore, because the rovings in sections 814 and 864 will form part of the center portion of the pultruded article, portion 1004 in FIG. 10(a), the guide plate roving density for the sidewall is therefore 1.00.

A pultruded article produced using the guide plates 800 and 850, and associated roving counts, would therefore have sidewalls with a guide plate roving density 13% greater than the guide plate roving density of the center portion.

The total number of rovings in a pultruded article formed using guide plates 800 and 850, with the configuration depicted in FIGS. 8(a) and 8(b), is 50.

Figure 9:
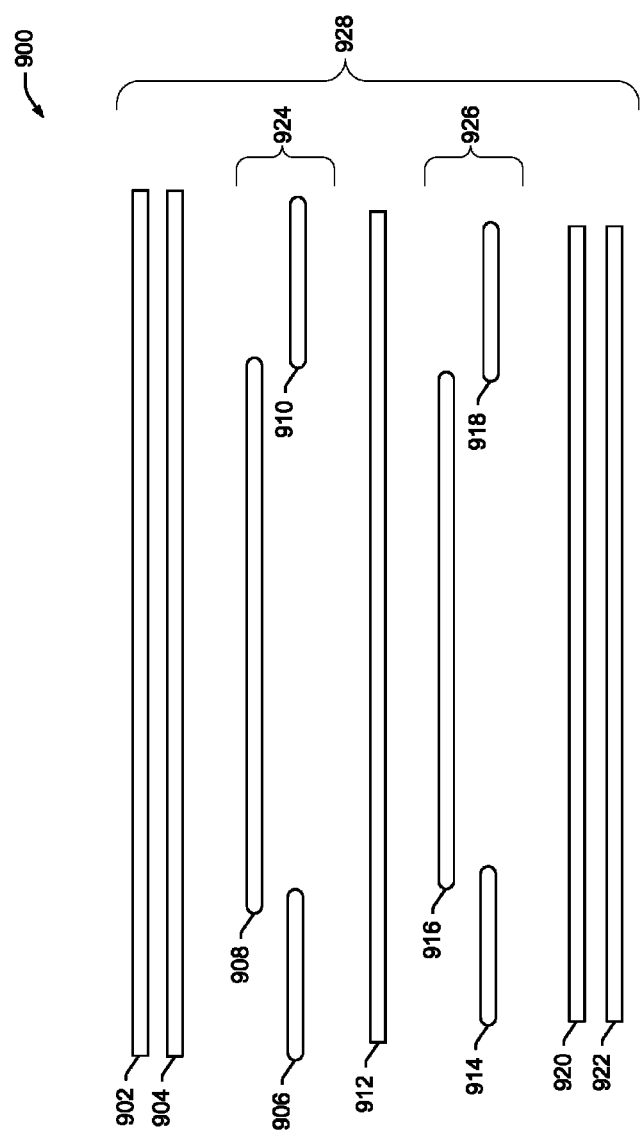
FIG. 9 is a diagram showing the arrangement of reinforcement components at one stage of one embodiment of Applicant's pultrusion process.

Referring to FIG. 9, a diagram 900 depicts an arrangement of resin-impregnated components 902-922 exiting the resin bath through a pre-forming guide plate, as depicted by 268 of FIG. 2, one embodiment of Applicant's pultrusion process. The pre-forming guide plate has openings corresponding to each of the component segments 902-922.

To better illustrate the relative arrangement of the individual components that make up the component stack 928 upon exiting the pre-forming guide plate 268, the individual components have been spread out vertically in FIG. 9 so that each individual component can be clearly depicted. The particular arrangement in diagram 900 is configured to produce a C-channel member as depicted in FIG. 10(a).

A veil 922 forms the bottom of the component stack 928. In various embodiments, the veil 922 is between about 2 inches to about 8 inches wide. In one embodiment, the veil 922 is about 5 inches wide.

A fiberglass mat 920 is disposed above the veil 922. In one embodiment, the fiberglass mat 920 is between about 2 to about 8 inches wide with a weight of about 0.75 to about 3.0 ounces per square foot. In one embodiment, the fiberglass mat 920 is about 5 inches wide with a weight of about 1 ounce per square foot.

A roving layer 926 comprises three sets of rovings 914, 916, and 918. Rovings set 916 forms the center portion of the member, as depicted by portion 1004 in FIG. 10(a). In one embodiment, roving set 916 contains between 10 and 40 individual rovings. Roving set 914 and roving set 918 form the left and right sidewalk, respectively, of the member, as depicted by portions 1008 and 1022 in FIG. 10(a). In various embodiments, roving set 914 and 918 each contain between 6 and 30 individual rovings.

The roving sets 914, 916, and 918 correspond to holes formed in a pre-forming guide plate and the lower guide plate. More specifically, roving set 914 is made up of the rovings fed into holes on the left side of the lower guide plate (i.e., to the left of lines 354, 458, 558, 658, 758, 858 in FIGS. 3(b)-8(b)), roving set 918 is made up of the rovings fed into holes on the right side of the lower guide plate (i.e., to the right of lines 356, 460, 560, 660, 760, 860 in FIGS. 3(b)-8(b)), and roving set 916 is made up of the rovings fed into holes in the center of the lower guide plate (i.e., between lines 354/356, 458/460, 558/560, 658/660, 758/760, 858/860 in FIGS. 3(b)-8(b)).

A fiberglass mat 912 is disposed above the roving set 916. In one embodiment, the fiberglass mat 912 is between about 2 to about 8 inches wide with a weight of about 0.75 to about 3.0 ounces per square foot. In one embodiment, the fiberglass mat 912 is about 5 inches wide with a weight of about 1 ounce per square foot.

A second roving layer 924 comprises three sets of rovings 906, 908, and 910. Roving set 908 forms primarily the center portion of the member, as depicted by portion 1004 in FIG. 10(a). In one embodiment, roving set 908 contains between 10 and 40 individual rovings. Roving set 906 and roving set 910 form primarily the left and right sidewalls, respectively, of the member, as depicted by portion 1008 and 1002 in FIG. 10(a). In one embodiment, roving set 906 and 910 each contain between 6 and 30 individual rovings.

The roving sets 906, 908, and 910 correspond to holes formed in a pre-forming guide plate and the upper guide plate. More specifically, roving set 906 is made up of the rovings fed into holes on the left side of the upper guide plate (i.e., to the left of lines 308, 408, 508, 608, 708, 808 in FIGS. 3(a)-8(a)), roving set 910 is made up of the rovings fed into holes on the right side of the upper guide plate (i.e., to the right of lines 310, 410, 510, 610, 710, 810 in FIGS. 3(a)-8(a) and roving set 908 is made up of the rovings fed into holes in the center of the upper guide plate (i.e., between lines 308/310, 408/410, 508/510, 608/610, 708/710, 808/810 in FIGS. 3(a)-8(a)).

A third fiberglass mat 904 is disposed above roving set 924. In one embodiment, the fiberglass mat 904 is about 2 to about 8 inches wide with a weight of about 0.75 to about 3.0 ounces per square foot. In one embodiment, the fiberglass mat 904 is about 5 inches wide with a weight of about 1 ounce per square foot.

A second veil 902 is disposed above the fiberglass mat 904 and completes the stack 928. In various embodiments, the veil 902 is between about 2 inches to about 8 inches wide. In one embodiment, the veil 902 is about 5 inches wide.

Referring to FIG. 10(a), a cross section 1000 of an exemplary pultruded article formed by Applicant's process is depicted. The cross section is across BB in FIG. 2. The pultruded article comprises a center portion 1004, two corner portions 1006 and 1010, and two sidewalls 1002 and 1008. The dashed lines indicate the boundary between the center portion and the sidewall portions.

In one embodiment, the center portion 1004 of the rail made by Applicant's process has a length (measured along the horizontal) of about 2.91 inches and the sidewall 1002 has a length (measured along the vertical) of about 1.20 inches. For different embodiments of a rail with these dimensions, the article roving density (i.e., number of rovings per unit length along the cross section) of at least one sidewall is greater than the article roving density of the center portion by 77%, 112%, 64%, 27%, and 158%, for the roving layout of FIGS. 4, 5, 6, 7, and 8, respectively.

In one embodiment, the center portion 1004 of the rail made by Applicant's process has a length (measured along the horizontal) of about 2.915 inches and the sidewall 1002 has a length (measured along the vertical) of about 1.17 inches. For different embodiments of a rail with these dimensions, the article roving density of at least one sidewall is greater than the article roving density of the center portion by 82%, 118%, 68%, 30%, and 165%, for the roving layout of FIGS. 4, 5, 6, 7, and 8, respectively.

In one embodiment, the center portion 1004 of the rail made by Applicant's process has a length (measured along the horizontal) of about 2.91 inches and the sidewall 1002 has a length (measured along the vertical) of about 1.005 inches. For different embodiments of a rail with these dimensions, the article roving density of at least one sidewall is greater than the article roving density of the center portion by 111%, 153%, 95%, 51%, and 208%, for the roving layout of FIGS. 4, 5, 6, 7, and 8, respectively.

Referring to FIG. 10(b), a drawing of one embodiment of a seven layer pultruded article 1050 across cross section AA of FIG. 10(a) is depicted. The lower layer is formed from a veil 1064. A fiberglass mat 1062 is disposed adjacent to the veil 1064. A roving layer 1060 is disposed adjacent to the fiberglass mat 1062. A fiberglass mat 1058 is disposed adjacent to the roving layer 1060. A roving layer 1056 is disposed adjacent to the fiberglass mat 1058. A fiberglass mat 1054 is disposed adjacent to the roving layer 1056. A veil 1052 is disposed adjacent to the fiberglass mat 1054.

The nine layer pultruded article 1050 is impregnated and surrounded by a polymer matrix formed by polymerizing the resin system. In different embodiments, the resin system is filler-free or has a filler content below 10 weight percent. In one embodiment, the resin system comprises up to 10 weight percent microspheres. In one embodiment, a resin system described in Table 2 above is used to form pultruded article 1050.

Referring to FIG. 10(c), a drawing of one embodiment of a nine layer pultruded article 1076 across cross section AA of FIG. 10(a) is depicted. The lower layer is formed from a veil 1096. A fiberglass mat 1094 is disposed adjacent to the veil 1096. A roving layer 1092 is disposed adjacent to the fiberglass mat 1094. A fiberglass mat 1090 is disposed adjacent to the roving layer 1092. A roving layer 1088 is disposed adjacent to the fiberglass mat 1090. A fiberglass mat 1084 is disposed adjacent to the roving layer 1088. A roving layer 1082 is disposed adjacent to the fiberglass mat 1084. A fiberglass mat 1080 is disposed adjacent to the roving layer 1082. A veil 1078 is disposed adjacent to the fiberglass mat 1080.

The nine layer pultruded article 1076 is impregnated and surrounded by a polymer matrix formed by polymerizing a resin system. In different embodiments, the resin system is filler-free or has a filler level below 10 weight percent. In one embodiment, the resin system comprises up to 10 weight percent microspheres. In one embodiment, a resin system described in Table 2 above is used to form pultruded article 1076.

In one embodiment, the veils 1052 and 1064 are omitted from article 1050, resulting in a pultruded article with 5 layers. In one embodiment, the veils 1078 and 1096 are omitted from article 1076, resulting in a pultruded article with 7 layers.

In another embodiment, the fiberglass mat 1054 and roving layer 1056 are omitted from article 1050, resulting in a pultruded article with 5 layers.

Referring to the foregoing paragraphs, this invention is described in preferred embodiments in the following description with reference to the Figures, in which like numerals represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While the invention is described through the above-described exemplary embodiments, it will be understood by those of ordinary skill in the art that modifications to, and variations of, the illustrated embodiments may be made without departing from the inventive concepts disclosed herein. For example, although some aspects of making and using a lightweight fiberglass reinforced material and ladders incorporating a lightweight fiberglass reinforced material have been described, those skilled in the art should readily appreciate that functions, operations, decisions, etc., of all or a portion of each step, or a combination of steps, of the series of steps described may be combined, separated into separate operations or performed in other orders. In addition, while the embodiments described herein relate to pultruded articles having a C-channel transverse cross section, those skilled in the art would readily appreciate that the processes described herein could readily be used to make lightweight articles having transverse cross sections of other shapes. Moreover, while the embodiments are described in connection with heavy duty ladders, one skilled in the art will recognize that Applicant's lightweight fiberglass reinforced articles can be produced using a variety of materials and can be used in a variety of products, for example without limitation, other types of ladders, including without limitation extension ladders, step ladders, trestle systems, shelf ladders, platform ladders, single ladders, combination ladders, tripod ladders, non-extendible ladders, telescoping ladders, and sectional ladders, as well as in components that are not related to, or incorporated in, ladders. Furthermore, disclosed aspects, or portions of these aspects, may be combined in ways not listed above. Accordingly, the invention should not be viewed as being limited to the disclosed embodiment(s).

What is claimed is:

1. A lightweight heavy-duty ladder, comprising:
   at least one set of rails, wherein:
   each said rail has a long-axis; and
   for each said rail of the at least one set of rails, a transverse cross-section of the rail comprises a center portion, a left sidewall portion adjacent and substantially perpendicular to the center portion, and a right sidewall portion adjacent and substantially perpendicular to the center portion;
   a plurality of rovings wherein:
   the rovings are embedded in and extend longitudinally along the long-axis of a respective said rail in each of the center portion, the left sidewall portion, and the right sidewall portion;
   an article roving density of the center portion is lower than a corresponding said article roving density of at least one of the right sidewall portion and the left sidewall portion; and
   the article roving density is a ratio of a number of said rovings per transverse cross-sectional area of the respective said portion;
   and
   a plurality of rungs disposed between each set of said rails of the at least one set of rails.

2. The ladder of claim 1, wherein the at least one set of rails comprise a polymerized filler-free resin.

3. The ladder of claim 1, wherein the at least one set of rails comprise a polymerized resin, wherein the polymerized resin comprises less than 10 weight percent filler.

4. The ladder of claim 1, wherein the at least one set of rails comprise a polymerized resin, wherein the polymerized resin comprises microspheres.

5. The ladder of claim 4, wherein the polymerized resin comprises up to 10 weight percent microspheres.

6. The ladder of claim 1, wherein the left sidewall portion and the right sidewall portion each have an article roving density at least 10% greater than that of the article roving density of the center portion.

7. The ladder of claim 1, wherein the roving is unwoven roving.

8. The ladder of claim 1, wherein the plurality of rovings are non-uniformly distributed within the transverse cross-section of each respective said rail.

9. The ladder of claim 1, wherein the roving comprises of one or more unidirectional filaments that each extend longitudinally along the long-axis of a respective said rail.

10. The ladder of claim 1, wherein the article roving density is highest at a region predicted to experience a high levels of stress when the ladder is in use.

11. The ladder of claim 1, wherein at least part of a perimeter of the transverse cross-section has a concave shape.

* * * * *